(12) United States Patent
Kato (10) Patent No.: US 11,140,005 B2
(45) Date of Patent: Oct. 5, 2021

(54) IN-VEHICLE COMMUNICATION SYSTEM BETWEEN MASTER NODE AND SLAVE NODE

(71) Applicant: DENSO CORPORATION, Kariya (JP)

(72) Inventor: Kenji Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 16/680,725

(22) Filed: Nov. 12, 2019

(65) Prior Publication Data

US 2020/0084063 A1 Mar. 12, 2020

Related U.S. Application Data

(63) Continuation of application No. PCT/JP2018/011270, filed on Mar. 22, 2018.

(30) Foreign Application Priority Data

May 17, 2017 (JP) .............................. JP2017-098459

(51) Int. Cl.
| | |
|---|---|
| *H04L 12/50* | (2006.01) |
| *H04L 12/403* | (2006.01) |
| *B60R 16/023* | (2006.01) |
| *H04L 12/40* | (2006.01) |

(52) U.S. Cl.
CPC .......... *H04L 12/403* (2013.01); *B60R 16/023* (2013.01); *H04L 12/40019* (2013.01); *H04L 2012/40273* (2013.01)

(58) Field of Classification Search
CPC ............ H04L 12/403; H04L 12/40019; H04L 2012/40273; B60R 25/24; B60R 16/023; G06F 15/16; G06F 7/00; G06F 13/20
See application file for complete search history.

(56) References Cited

U.S. PATENT DOCUMENTS

| | | | | |
|---|---|---|---|---|
| 8,776,072 | B2 * | 7/2014 | Kishita | ..................... G06F 9/52 718/103 |
| 2006/0020372 | A1 * | 1/2006 | Watabe | .................. H04L 43/10 701/1 |
| 2009/0118906 | A1 * | 5/2009 | Tanaka | .................. B60W 30/02 701/41 |

(Continued)

FOREIGN PATENT DOCUMENTS

| | | |
|---|---|---|
| JP | 2006211425 A | 8/2006 |
| JP | 200878769 A | 4/2008 |

(Continued)

*Primary Examiner* — Abdelnabi O Musa
(74) *Attorney, Agent, or Firm* — Harness, Dickey & Pierce, P.L.C.

(57) ABSTRACT

A communication system includes a master node and a slave node connected to the master node via a bus. The master node transmits a header including identification information assigned to a designated function in accordance with a schedule preset individually for the designated function. The slave node has a plurality of functions for each of which a response different from each other is transmitted. The slave node returns the response related to the designated function upon receipt of the header when the designated function assigned with the identification information included in the header is one of the plurality of functions of the slave node.

5 Claims, 8 Drawing Sheets

(56) References Cited

U.S. PATENT DOCUMENTS

| | | | |
|---|---|---|---|
| 2011/0238262 A1* | 9/2011 | Fukuta | B60W 50/045 |
| | | | 701/33.4 |
| 2012/0084378 A1 | 4/2012 | Kaneko et al. | |
| 2013/0117483 A1* | 5/2013 | Boeck | G06F 13/364 |
| | | | 710/110 |
| 2014/0188348 A1* | 7/2014 | Gautama | B60W 10/30 |
| | | | 701/48 |
| 2017/0158168 A1* | 6/2017 | Nantz | G07C 9/00309 |

FOREIGN PATENT DOCUMENTS

| JP | 2010200091 A | 9/2010 |
|---|---|---|
| JP | 201280360 A | 4/2012 |
| JP | 2015226200 A | 12/2015 |

* cited by examiner

| SCHEDULE TABLE | FUNCTION | HEADER ID | NUMBER OF TIMES OF RESPONSE |
|---|---|---|---|
| 0×01 | PEPS FUNCTION | 0×01 | 2 FRAMES |
| 0×02 | RKE FUNCTION | 0×02 | 3 FRAMES |
| 0×03 | TPM FUNCTION | 0×03 | 1 FRAME |

FIG. 3

| ORDER | HEADER ID | CONTENT OF RESPONSE | COMMUNICATION FRAME TIME |
|---|---|---|---|
| FIRST | 0×01 (PEPS FUNCTION) | RESPONSE RELATED TO PEPS FUNCTION | 10 msec |

FIG. 4

| ORDER | HEADER ID | CONTENT OF RESPONSE | COMMUNICATION FRAME TIME |
|---|---|---|---|
| FIRST | 0×02 (RKE FUNCTION) | RESPONSE RELATED TO RKE FUNCTION | 10 msec |

FIG. 5

| ORDER | HEADER ID | CONTENT OF RESPONSE | COMMUNICATION FRAME TIME |
|---|---|---|---|
| FIRST | 0×03 (TPM FUNCTION) | RESPONSE RELATED TO TPM FUNCTION | 10 msec |

FIG. 6

| BREAK | SYNC | FUNCTIONAL ID (6 bits HEADER ID, 2 bits PARITY) |

FIG. 7

1byte

| FRAME No 4 bits | STATUS LIKE ERROR 4 bits | REPLY DATA 1 TO 7 bytes |

| ORDER | HEADER ID | CONTENT OF RESPONSE | COMMUNICATION FRAME TIME |
|---|---|---|---|
| FIRST | 0×01 (RF RECEIVER) | RESPONSE RELATED TO PEPS FUNCTION: FIRST | 10 msec |
| SECOND | 0×01 | RESPONSE RELATED TO PEPS FUNCTION: SECOND | 10 msec |
| THIRD | 0×01 | RESPONSE RELATED TO RKE FUNCTION: FIRST | 10 msec |
| FOURTH | 0×01 | RESPONSE RELATED TO RKE FUNCTION: SECOND | 10 msec |
| FIFTH | 0×01 | RESPONSE RELATED TO RKE FUNCTION: THIRD | 10 msec |
| SIXTH | 0×01 | RESPONSE RELATED TO TPM FUNCTION: FIRST | 10 msec |

IN-VEHICLE COMMUNICATION SYSTEM BETWEEN MASTER NODE AND SLAVE NODE

CROSS REFERENCE TO RELATED APPLICATIONS

The present application is a continuation application of International Patent Application No. PCT/JP2018/011270 filed on Mar. 22, 2018, which designated the U.S. and claims the benefit of priority from Japanese Patent Application No. 2017-098459 filed on May 17, 2017. The entire disclosures of all of the above applications are incorporated herein by reference.

TECHNICAL FIELD

The present disclosure relates a communication system, a master node, and a control program product.

BACKGROUND

There is known a technique for communication between an electronic control unit (hereinafter, an ECU) and a control target device connected via a serial communication signal line according to a communication protocol adopting a master-slave system with reference to a schedule.

SUMMARY

The present disclosure provides a communication system includes a master node and a slave node connected to the master node via a bus. The master node transmits a header including identification information assigned to a designated function in accordance with a schedule preset individually for the designated function. The slave node has a plurality of functions for each of which a response different from each other is transmitted. The slave node returns the response related to the designated function upon receipt of the header when the designated function assigned with the identification information included in the header is one of the plurality of functions of the slave node. The present disclosure also provides the master node, and a control program product for controlling a computer in the master node.

BRIEF DESCRIPTION OF DRAWINGS

Objects, features and advantages of the present disclosure will become apparent from the following detailed description made with reference to the accompanying drawings. In the drawings.

DETAILED DESCRIPTION

Examples of a communication protocol adopting a master-slave system applied to a communication system include a Local Interconnect network (LIN). In a communication system adopting the LIN according to one example, a master node transmits headers each including an ID of a node expected to take action sequentially in accordance with a schedule, and each node returns a response if the transmitted header includes an ID of an own node.

When a single slave node has a plurality of functions for each of which a response different from each other is transmitted (hereinafter, simply called a plurality of functions), the master node repeats sequential header transmission the number of times corresponding to the number of the functions and receives response for each of the functions. If a response related to a single function of the slave node is returned a plurality of times for a plurality of frames, an operation of sequentially transmitting the headers a necessary number of times of response is added and the responses are returned the necessary number of times for this function.

In the communication system according to the above-described example, a responsiveness of the master node receiving the responses from the slave node becomes deteriorated in a case where the slave node has a plurality of functions. Details are described below.

The communication system according to the above-described example fails to identify and designate each of the functions of the slave node by means of the headers. Thus, a response to which function is to be returned upon transmission of a header having which order number is defined in a schedule, and responses are returned sequentially for all of the functions. Accordingly, the response related to a target function is received.

The master node receives the response related to the target function after responses not related to the target function are sequentially returned, which deteriorates the responsiveness. If a single function needs a plurality of times of response for a plurality of frames, a delay time becomes longer with increase in the number of times of response, and the responsiveness becomes further deteriorated.

A communication system according to a first aspect of the present disclosure includes a master node and at least one slave node connected to the master node via a bus. The master node includes a transmission unit configured to transmit a header including identification information on a designated target in accordance with a preset schedule. The slave node includes a return unit configured to return a response upon receipt of the header. The slave node at least includes a slave node having a plurality of functions for each of which the response different from each other is transmitted. The transmission unit transmits the header including, as the identification information on the designated target, the identification information assigned individually to a designated one of the functions, in accordance with a schedule preset individually for each of the functions. The return unit returns the response related to the function designated by the identification information when the identification information included in the header that is received is the identification information on the function of an own slave node.

According to this configuration, the master node transmits the header including the identification information assigned individually to the designated function, and the slave node returns the response related to the function designated by the identification information. Even when the slave node has the plurality of functions for each of which the response different from each other is transmitted, this configuration enables return of the response related to the designated function. The header is transmitted in accordance with the schedule preset individually for each of the functions. This configuration can prevent transmission of any header designating any function other than the target function. This configuration can thus achieve further improvement in responsiveness of the master node receiving the response from the slave node in comparison to a case of sequentially returning the responses for all of the functions.

This enables further improvement in responsiveness of the master node receiving the response from the slave node even when the slave node has the plurality of functions for each of which the response different from each other is transmitted.

A master node according to a second aspect of the present disclosure is applied to a communication system including the master node and at least one slave node connected to the master node via a bus. The master node includes a transmission unit configured to transmit a header including identification information on a designated target in accordance with a preset schedule, and a response reception unit configured to receive a response returned from the slave node configured to return the response upon receipt of the header. The transmission unit transmits, to the slave node having a plurality of functions for each of which the response different from each other is transmitted, as the identification information on the designated target, the header including the identification information assigned individually to a designated one of the functions, in accordance with a schedule preset individually for each of the functions.

A first control program product according to a third aspect of the present disclosure is stored in a non-transitory tangible computer-readable storage medium for controlling a master node applied to a communication system including the master node and at least one slave node connected to the master node via a bus. The control program product instructs a computer to function as a transmission unit transmitting a header including identification information on a designated target in accordance with a preset schedule, and a response reception unit receiving a response returned from the slave node configured to return the response upon receipt of the header. The transmission unit is further instructed to transmit, to the slave node having a plurality of functions for each of which the response different from each other is transmitted, as the identification information on the designated target, the header including the identification information assigned individually to a designated one of the functions, in accordance with a schedule preset individually for each of the functions.

With the master node according to the second aspect and the first control program product according to the third aspect, the master node transmits the header including the identification information assigned individually to the designated function, and the slave node returns the response related to the function designated by the identification information. Even when the slave node has the plurality of functions for each of which the response different from each other is transmitted, this configuration enables return of the response through designation of the function. The header is transmitted in accordance with the schedule preset individually for each of the functions. This configuration can prevent transmission of any header designating any function other than the target function. This configuration can thus achieve further improvement in responsiveness of the master node receiving the response from the slave node in comparison to a case of sequentially returning the responses for all of the functions.

This enables further improvement in responsiveness of the master node receiving the response from the slave node even when the slave node has the plurality of functions for each of which the response different from each other is transmitted.

A slave node according to a fourth aspect of the present disclosure is applied to a communication system including a master node and at least one slave node connected to the master node via a bus. The slave node includes a header reception unit configured to receive a header transmitted from the master node, the header including identification information on a designated target, and a return unit configured to return a response upon receipt of the header by the header reception unit. When the identification information included in the header received by the header reception unit relates to any one of a plurality of functions of own slave node for each of which the response different from each other is transmitted, the return unit returns the response related to one of the functions designated by the identification information.

A second control program product according to a fifth aspect of the present disclosure is stored in a non-transitory tangible computer-readable storage medium for controlling a slave node applied to a communication system including a master node and at least one slave node connected to the master node via a bus. The control program product instructs a computer to function as a header reception unit receiving a header transmitted from the master node, the header including identification information on a designated target, and a return unit returning a response upon receipt of the header. The response unit is further instructed to return the response related to a function designated by the identification information when the identification information included in the header that is received relates to any one of a plurality of functions of an own slave node for each of which the response different from each other is transmitted.

With the slave node according to the fourth aspect and the second control program product according to the fifth aspect, when the identification information included in the header that is received relates to any one of the functions of the own slave node for each of which the response different from each other is transmitted, the slave node returns the response related to the function designated by the identification information. Even when the slave node has the plurality of functions for each of which the response different from each other is transmitted, the slave node can return the response only related to the function designated by the master node. This configuration can thus achieve further improvement in responsiveness of the master node receiving the response from the slave node in comparison to a case of sequentially returning the responses for all of the functions.

This enables further improvement in responsiveness of the master node receiving the response from the slave node even when the slave node has the plurality of functions for each of which the response different from each other is transmitted.

A plurality of embodiments will be described for disclosure hereinafter with reference to the drawings. For convenience of description, any part functioning identically to a part shown in any figure having been referred to in foregoing description will be denoted by an identical reference sign and may not be described repeatedly in the plurality of embodiments. Description in another applicable embodiment may be referred to for such a part denoted by the identical reference sign.

First Embodiment

Figure 1:
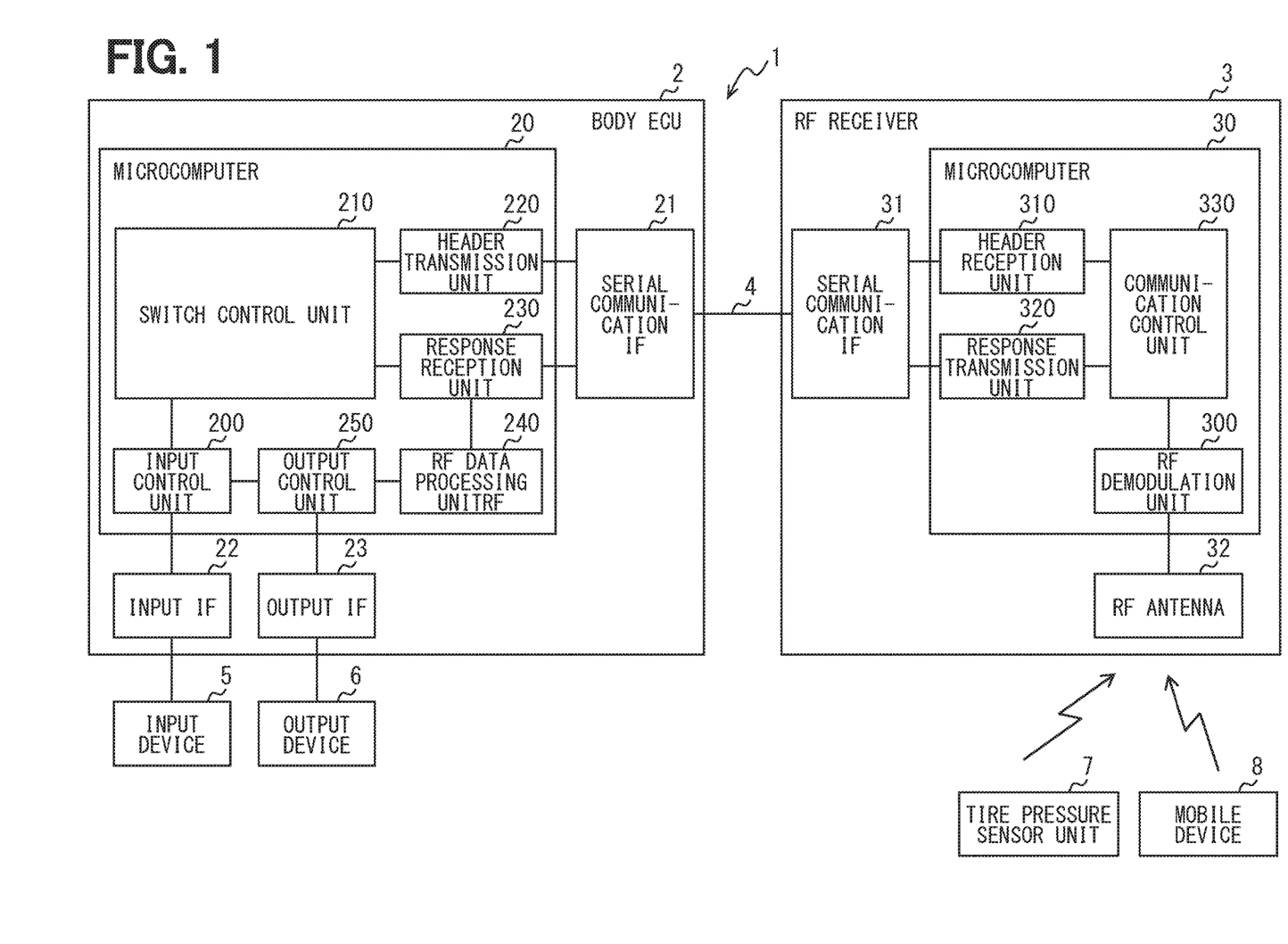
FIG. 1 is a diagram showing an example of a schematic configuration of an in-vehicle communication system according to a first embodiment of the present disclosure.

A first embodiment of the present disclosure will be described below with reference to the drawings. An in-vehicle communication system 1 is mounted on a vehicle, and includes a body ECU 2, an RF receiver 3, and a serial communication line 4, as shown in FIG. 1. The in-vehicle communication system 1 corresponds to a communication system.

The in-vehicle communication system 1 is an in-vehicle network configured to execute communication according to a communication protocol adopting a master-slave system, on the basis of a schedule. The following description assumes that the in-vehicle communication system 1 executes serial communication according to a communication protocol such as the Local Interconnect Network (LIN).

The body ECU 2 is an electronic control unit configured to control lighting of an own vehicle by means of a headlight, a hazard lamp, an indicator lamp, an interior light, and the like, door locking and unlocking, as well as body-related equipment such as an automatic window, and is connected to the RF receiver 3, an input device 5, and an output device 6. The body ECU 2 corresponds to a master node of the in-vehicle communication system 1. The body ECU 2 is connected to the RF receiver 3 via the serial communication line 4. The serial communication line 4 is a single signal line (i.e., a single wire) and corresponds to a bus.

The input device 5 is a switch (hereinafter, SW) and/or a sensor for the body-related equipment. Examples of the input device 5 include a door lock SW provided at a door handle of the own vehicle, a courtesy SW for detection of an open/closed state of a door of the own vehicle, a light SW configured to turn ON and turn OFF lighting, and a start SW configured to start a travel drive source of the own vehicle. The output device 6 is an actuator for body-related equipment, lighting, or the like. Examples of the output device 6 include a door lock motor for a door of the own vehicle and various lighting.

The RF receiver 3 is configured to receive RF signals from a tire pressure sensor unit 7 and a mobile device 8, and is connected to the body ECU 2 via the serial communication line 4. The RF receiver 3 corresponds to a slave node of the in-vehicle communication system 1. The RF signals are transmitted on a UHF-band radio wave. The UHF band may be a frequency band from 300 MHz to 3 GHz.

The tire pressure sensor unit 7 may include a pneumatic sensor configured to detect tire pressure, a wireless communication unit configured to transmit and receive data by means of wireless communication, and a control unit configured to control the wireless communication unit. The tire pressure sensor unit 7 may be provided at each tire of the own vehicle and be configured to detect pressure of each tire and transmit an RF signal including data on the tire pressure thus detected by means of wireless communication.

The tire pressure sensor unit 7 is exemplarily configured to transmit such an RF signal including data on the tire pressure detected by the pneumatic sensor upon receipt of a request signal for data on tire pressure, transmitted on an LF-band radio wave, from an LF antenna mounted on the own vehicle. The LF band may be a frequency band from 30 kHz to 300 kHz.

The mobile device 8 has a function of a so-called electronic key, and may include a switch operated by a user, a wireless communication unit configured to transmit and receive data by means of wireless communication, and a control unit configured to control the wireless communication unit. The mobile device 8 may be a so-called Fob, a multifunctional mobile phone having a function of an electronic key, or the like. The mobile device 8 is configured to execute processing related to a Remote Keyless Entry (RKE) function and processing related to a Passive Entry Passive Start (PEPS) function.

The RKE function relates to control of locking and unlocking a vehicle door through authentication processing of transmitting an RF signal including an authentication code and a command for vehicle control such as locking and unlocking in accordance with switch operation to the mobile device 8. The PEPS function relates to control of locking and unlocking a vehicle door and start permission of the travel drive source through authentication processing by means of wireless communication without switch operation to the mobile device 8. As processing related to the Passive Entry Passive Start (PEPS) function, the mobile device 8 may be configured to transmit an RF signal including an authentication code upon receipt of a request signal for the authentication code transmitted on the LF-band radio wave from the LF antenna mounted on the own vehicle.

The RF receiver 3 receives an RF signal including data on a tire pressure transmitted from the tire pressure sensor unit 7. The RF receiver 3 has a function related to a Tire Pressure Monitoring (TPM) function of monitoring a tire pressure detection result. The RF receiver 3 also receives an RF signal according to switch operation to the mobile device 8, transmitted from the mobile device 8. This means that the RF receiver 3 also has a function related to the RKE function. The RF receiver 3 further receives an RF signal including an authentication code transmitted from the mobile device 8, without switch operation to the mobile device 8. This means that the RF receiver 3 also has a function related to the PEPS function. As described above, the RF receiver 3 has a plurality of functions including the function related to the TPM function, the function related to the RKE function, and the function related to the PEPS function. The function related to the TPM function, the function related to the RKE function, and the function related to the PEPS function of the RF receiver 3 will hereinafter be called the TPM function, the RKE function, and the PEPS function, for convenience.

The body ECU 2 functioning as the master node transmits a header as a transmission request to the serial communication line 4, and receives a response transmitted in accordance with the header from the body ECU 2 as the master node or the RF receiver 3 as the slave node. The following description will exemplify, for convenience, the case where the body ECU 2 receives a response transmitted from the RF receiver 3 as the slave node in the present embodiment. Specifically, the body ECU 2 transmits a header to the RF receiver 3 to receive a response related to the TPM function, a response related to the RKE function, and a response related to the PEPS function. The response related to the TPM function may include reply data on a tire pressure detection result. The response related to the RKE function may include reply data on an authentication code and a command. The response related to the PEPS function may include reply data on an authentication code.

Next, a schematic configuration of the body ECU 2 will be described with reference to FIG. 1. As shown in FIG. 1, the body ECU 2 includes a microcomputer 20, a serial communication IF 21, an input IF 22, and an output IF 23.

The serial communication IF 21 is an interface for communication executed by the body ECU 2 via the serial communication line 4. The input IF 22 is an interface for reception of input from the input device 5 by the body ECU 2. The output IF 23 is an interface for output from the body ECU 2 to the output device 6.

The microcomputer 20 includes a processor, a memory, an I/O, and a bus connecting these elements. The memory referred to herein is a non-transitory tangible storage medium configured to non-temporarily store a program and data readable by a computer. The non-transitory tangible storage medium is embodied by a semiconductor memory or a magnetic disk. The microcomputer 20 executes a control program stored in the memory to actualize various functions of the body ECU 2 such as serial communication with the RF receiver 3. The control program for realizing functions of the microcomputer 20 related to serial communication with the RF receiver 3 corresponds to a control program product.

Next, a schematic configuration of the microcomputer 20 of the body ECU 2 will be described. As shown in FIG. 1, the microcomputer 20 includes, as functional blocks, an input control unit 200, a switch control unit 210, a header transmission unit 220, a response reception unit 230, an RF data processing unit 240, and an output control unit 250. Part or all of the functions executed by the microcomputer 20 may be configured as hardware by a single or a plurality of ICs or the like. Part or all of the functional blocks of the microcomputer 20 may be embodied by combination between execution of software by the processor and a hardware member.

The input control unit 200 executes control related to input from the input device 5. For example, the input control unit 200 acquires a signal from the input device 5. The switch control unit 210 switches a schedule defining timing for header transmission from the body ECU 2. The switch control unit 210 switches the schedule dependently on variation in vehicle status, in accordance with a plurality of schedule tables preliminarily stored in a nonvolatile memory.

Relations between the schedule tables and serial communication according to the present embodiment will be exemplarily described below with reference to FIG. 2. The present embodiment assumes that header identification information (hereinafter, referred to as a header ID) is assigned individually to each function of a node, and a schedule is preset individually for each function of the node. The following description assumes that the functions of the node include the PEPS function, the RKE function, and the TPM function of the RF receiver 3 as the slave node.

Figure 2:
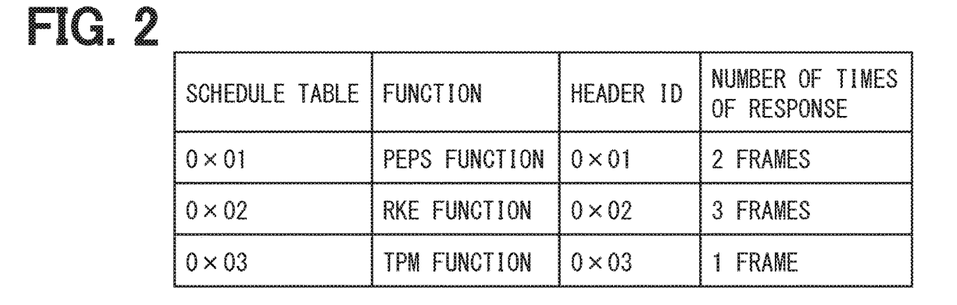
FIG. 2 is a diagram for explaining an example of relations between schedule tables and serial communication according to the first embodiment.

A header ID is assigned individually to each of the functions of the node, specifically, a header ID "0x01" to the PEPS function, a header ID "0x02" to the RKE function, and a header ID "0x03" to the TPM function as indicated in FIG. 2. There are provided schedule tables respectively for the header IDs "0x01", "0x02", and "0x03", in other words, respectively for the functions of the node. Assume that the number of times of response related to the PEPS function is two frames, the number of times of response related to the RKE function is three frames, and the number of times of response related to the TPM function is one frame. The number of times of response related to each of the functions may be preliminarily stored in a nonvolatile memory or the like.

The schedule tables according to the present embodiment will be exemplarily described next with reference to FIG. 3 to FIG. 5. The schedule tables according to the present embodiment are provided respectively for the functions of the node as described above. The schedule table (see FIG. 3) for the PEPS function, the schedule table (see FIG. 4) for the RKE function, and the schedule table (see FIG. 5) for the TPM function are preliminarily stored in a nonvolatile memory or the like.

The schedule table for the PEPS function defines returning the responses related to the PEPS function during communication frame time of 10 msec with respect to transmission of a header including the header ID "0x01" related to the PEPS function. The schedule table for the RKE function defines returning the responses related to the RKE function during the communication frame time of 10 msec with respect to transmission of a header including the header ID "0x02" related to the RKE function. The schedule table for the TPM function defines returning the response related to the TPM function during the communication frame time of 10 msec with respect to transmission of a header including the header ID "0x03" related to the TPM function. Each of these schedule tables merely defines a first action, and is assumed to define repeating the same action.

The switch control unit 210 switches a schedule dependently on variation in vehicle status, in accordance with the plurality of schedule tables, with a trigger including a signal acquired by the input control unit 200 from the input device 5 and processing by the output control unit 250 to be described later.

The header transmission unit 220 transmits, via the serial communication IF 21, a header including a header ID related to a designated function, in accordance with the schedule switched by the switch control unit 210. The header transmission unit 220 corresponds to a transmission unit. In a case of switching to the schedule indicated in the schedule table for the PEPS function, a header including the header ID "0x01" is transmitted every 10 msec until the schedule is switched to another schedule or the body ECU 2 comes into a sleep state. The same applies to a case of switching to the schedule indicated in the schedule table for the RKE function and a case of switching to the schedule indicated in the schedule table for the TPM function, except that the header ID is changed to "0x02" and "0x03", respectively.

Figure 6:
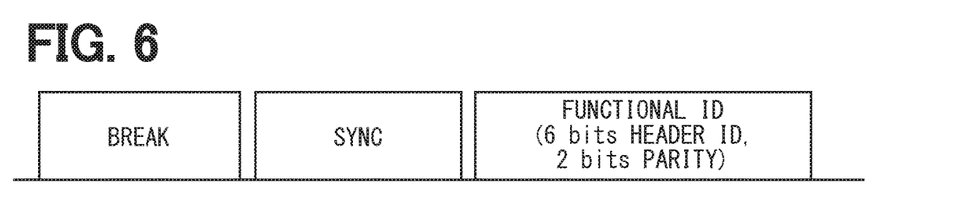
FIG. 6 is a diagram for explaining an example of a data structure of a header according to the first embodiment.

An exemplary data structure of a header according to the present embodiment will be described below with reference to FIG. 6. The header according to the present embodiment includes three fields "Break", "Synch", and "Functional ID" as shown in FIG. 6. The header according to the present embodiment is similar to a conventional header adopted in the LIN, except that "Functional ID" replaces "Protected ID". The field "Functional ID" is different from the field "Protected ID" in that "Functional ID" includes a header ID assigned individually to each function of the node, in place of a frame ID having 6 bits assigned to each node along with parity having 2 bits.

Specifically, the body ECU 2 includes the switch control unit 210 configured to switch to a schedule according to the designated function from among schedules preset individually for each of the functions, and the header transmission unit 220 transmits a header in accordance with the schedule switched by the switch control unit 210.

The response reception unit 230 receives responses returned from the RF receiver 3 in accordance with the header transmitted from the header transmission unit 220. The response reception unit 230 receives the response including reply data related to the PEPS function upon transmission of the header including the header ID related to the PEPS function, and receives the response including reply data related to the RKE function upon transmission of the header including the header ID related to the RKE function. The response reception unit 230 receives the response including reply data related to the TPM function upon transmission of the header including the header ID related to the TPM function.

Figure 7:
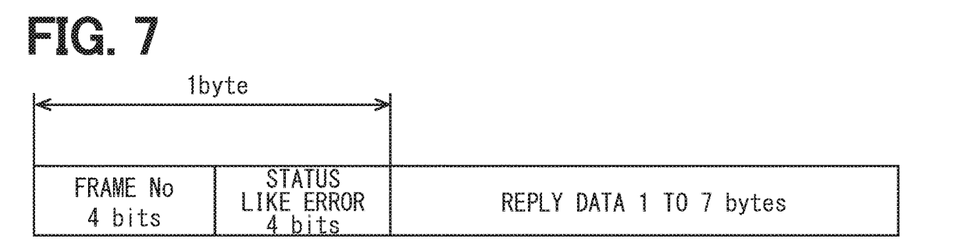
FIG. 7 is a diagram for explaining a data structure of a response according to the first embodiment.

An exemplary data structure of a data field in response according to the present embodiment will be described below with reference to FIG. 7. The data field in the response according to the present embodiment includes three types of data, namely, "frame No", "status", and "reply data" as shown in FIG. 7. The data field in the response according to the present embodiment is similar to a data field in conventional response adopted by the LIN, except for inclusion of "frame No". The response is assumed to include a check sum field as well as the data field.

The data "status" is 4-bit data indicating a status such as an error, and the data "reply data" is data received by the RF receiver 3 from the tire pressure sensor unit 7 and the mobile device 8. For example, the reply data related to the PEPS function may include an authentication code received by the RF receiver 3 from the mobile device 8, and the reply data related to the RKE function may include an authentication code and a command received by the RF receiver 3 from the mobile device 8. The reply data related to the TPM function may include data on tire pressure received by the RF receiver 3 from the tire pressure sensor unit 7.

The data "frame No" is 4-bit data indicating an order number of response with respect to header transmission. The data "frame No" corresponds to order information. For example, with respect to transmission of the header including the header ID related to the PEPS function, since the number of times of response is two frames, there is a first response and a second response as responses.

Figure 8:
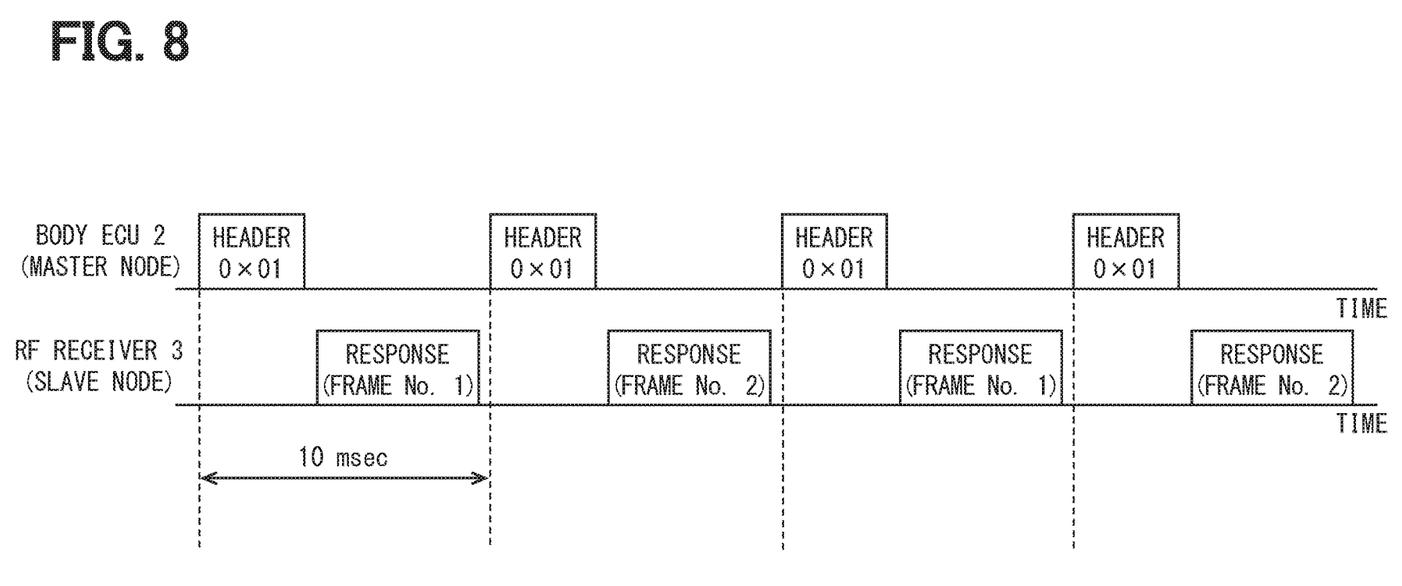
FIG. 8 is a diagram for explaining an example of returns of responses upon transmissions of headers according to the first embodiment.

An example of returns of the responses with respect to transmission of the header including the header ID related to the PEPS function will be described below with reference to FIG. 8. As shown in FIG. 8, the body ECU 2 as the master node transmits the header including the header ID "0x01" every 10 msec in accordance with the schedule indicated in the schedule table in FIG. 3. Upon each receipt of this header, the RF receiver 3 as the slave node alternately returns the first response including a "frame No" indicating the first order and the second response including a "frame No" indicating the second order.

The response reception unit 230 determines response completion for the function designated by the header transmitted from the header transmission unit 220, in accordance with the "frame No" included in response received sequentially and the number of times of returning response for each function, stored in the nonvolatile memory of the body ECU 2. For example, the response reception unit 230 determines response completion upon acquisition of response in an appropriate order the number of return times for the function, and transmits, to the RF data processing unit 240, reply data in the acquired response.

The RF data processing unit 240 executes processing according to the reply data acquired from the response reception unit 230. In a case where the reply data includes an authentication code, the RF data processing unit 240 executes authentication of collating the authentication code with a formal authentication code preregistered in the nonvolatile memory of the body ECU 2. In another case where the reply data includes a command as well as an authentication code, the RF data processing unit 240 transmits the command to the output control unit 250. In still another case where the reply data includes data on tire pressure, the RF data processing unit 240 may output the data on the tire pressure to an ECU such as a meter ECU configured to execute notification of the tire pressure.

If the input control unit 200 acquires a signal indicating operation of the door lock SW and the RF data processing unit 240 completes collation of authentication codes, the output control unit 250 drives the door lock motor of the door of the own vehicle to lock or unlock the door of the own vehicle. If the output control unit 250 acquires the command from the RF data processing unit 240 and the RF data processing unit 240 completes collation of authentication codes, the output control unit 250 controls the vehicle in accordance with the command. If the RF data processing unit 240 completes collation of authentication codes, the output control unit 250 may further output a start permission signal for the travel drive source to an ECU configured to control the travel drive source of the own vehicle.

The present embodiment provides the exemplary case where the body ECU 2 causes notification of decrease in tire pressure to be executed in accordance with data on tire pressure. The body ECU 2 is not limited to such a configuration, but may alternatively be configured to output the data on the tire pressure to a device configured to control the vehicle in accordance with the data on the tire pressure.

A schematic configuration oftThe RF receiver 3 will be described with reference to FIG. 1. As shown in FIG. 1, the RF receiver 3 includes a microcomputer 30, a serial communication IF 31, and an RF antenna 32.

The serial communication IF 31 is an interface for communication by the RF receiver 3 via the serial communication line 4. The RF antenna 32 is configured to receive RF signals transmitted from the tire pressure sensor unit 7 and the mobile device 8 on the UHF-band radio wave.

The microcomputer 30 includes a processor, a memory, an I/O, and a bus connecting these elements. The memory referred to herein is a non-transitory tangible storage medium configured to non-temporarily store a program and data readable by a computer. The non-transitory tangible storage medium is embodied by a semiconductor memory or a magnetic disk. The microcomputer 30 executes a control program stored in the memory to actualize various functions of the RF receiver 3 such as serial communication with the body ECU 2 and reception of an RF signal. The control program for actualization of functions of the microcomputer 30 related to serial communication with the body ECU 2 also corresponds to a control program.

The microcomputer 30 of the RF receiver 3 will be described next in terms of a schematic configuration thereof. As shown in FIG. 1, the microcomputer 30 includes, as functional blocks, an RF demodulation unit 300, a header reception unit 310, a response transmission unit 320, and a communication control unit 330. Part or all of the functions executed by the microcomputer 30 may be configured as hardware by a single or a plurality of ICs or the like. For example, all the functions executed by the microcomputer 30 may be embodied by an Application Specific Integrated circuit (ASIC). Part or all of the functional blocks of the microcomputer 30 may be embodied by combination between execution of software by the processor and a hardware member.

The RF demodulation unit 300 demodulates a RF signal received by the RF antenna 32, extracts data included in the RF signal, and transmits the extracted data to the communication control unit 330. Examples of the data in the RF signal include data on tire pressure detected by the tire pressure sensor unit 7, an authentication code and a command transmitted from the mobile device 8.

The header reception unit 310 receives the header transmitted from the body ECU 2. The response transmission unit 320 transmits the response output from the communication control unit 330, in accordance with the header received by the header reception unit 310. The response transmission unit 320 corresponds to a return unit. The response transmission unit 320 transmits the response having a data structure of the data field shown in FIG. 7.

The communication control unit 330 temporarily stores data included in a RF signal acquired from the RF demodulation unit 300 in a memory such as a volatile memory. If the header received by the header reception unit 310 includes a header ID related to any one of the functions of the RF receiver 3, the communication control unit 330 reads data on the function designated by the header ID from the volatile memory and generates a response including the data as reply data to be transmitted from the response transmission unit 320. As described earlier, the response includes the "frame No" indicating the order number of the response, such that the response transmission unit 320 sequentially returns responses a necessary number of times of response upon each receipt of a header.

With the header ID "0×01" designating the PEPS function, the response transmission unit 320 transmits, by each frame, response for two frames including an authentication code as reply data upon each receipt of a header including the header ID "0×01" until the end of reception of the header. With the header ID "0×02" designating the RKE function, the response transmission unit 320 transmits, by each frame, response for three frames including an authentication code and a command as reply data upon each receipt of a header including the header ID "0×02" until the end of reception of the header. With the header ID "0×03" designating the TPM function, the response transmission unit 320 transmits response for one frame including data on the tire pressure as reply data upon each receipt of the header including the header ID "0×03" until the end of reception of the header.

Figure 9:
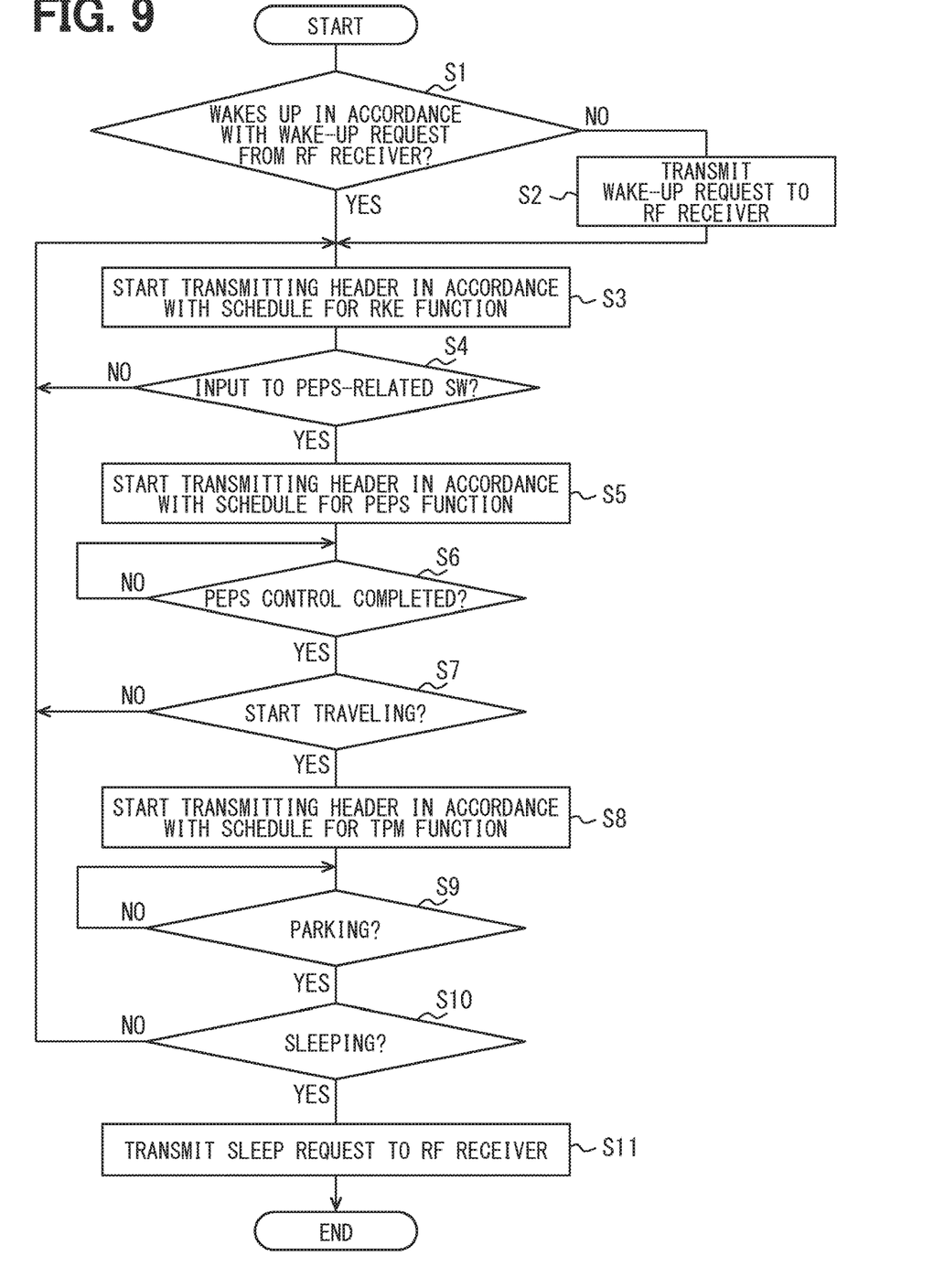
FIG. 9 is a flowchart showing an exemplary flow of a serial communication related processing executed by a body ECU.

An exemplary flow of processing related to serial communication (hereinafter, serial communication related processing) executed by the body ECU 2 as the master node will be described below with reference to the flowchart in FIG. 9. The flowchart in FIG. 9 may start when the body ECU 2 wakes up from the sleep state.

In a case where the body ECU 2 wakes up in accordance with a wake-up request from the RF receiver 3 initially in S1 (YES in S1), the process flow proceeds to S3. In another case where the body ECU 2 wakes up not in accordance with the wake-up request from the RF receiver 3 (NO in S1), the process flow proceeds to S2. Examples of the case where the body ECU 2 wakes up not in accordance with the wake-up request from the RF receiver 3 include waking up in accordance with input from the input device 5 to the body ECU 2.

In S2, the microcomputer 20 transmits a wake-up request to the RF receiver 3 via the serial communication line 4 to wake up the RF receiver 3 from the sleep state. The process flow then proceeds to S3. In S3, the switch control unit 210 switches to the schedule indicated in the schedule table for the RKE function (hereinafter, simply called the schedule for the RKE function), and the header transmission unit 220 starts header transmission in accordance with the schedule for the RKE function.

In a case where the input control unit 200 acquires input through a SW related to the PEPS function (hereinafter, a PEPS-related SW) in S4, in other words, if there is input through the PEPS-related SW (YES in S4), the process flow proceeds to S5. In another case where there is no input through the PEPS-related SW (NO in S4), the process flow returns to S3 for repeated processing. Examples of the PEPS-related SW include the door lock SW, the start SW, and the door courtesy SW.

In S5, the switch control unit 210 switches to the schedule indicated in the schedule table for the PEPS function (hereinafter, simply called the schedule for the PEPS function), and the header transmission unit 220 starts header transmission in accordance with the schedule for the PEPS function.

In a case where the output control unit 250 completes control related to the PEPS function (hereinafter, PEPS control) in S6 (YES in S6), the process flow proceeds to S7. The processing in S6 is repeated in another case where the PEPS control is not completed (NO in S6). Examples of the PEPS control include locking and unlocking the door by driving the door lock motor of the door of the own vehicle, and start permission of the travel drive source through output of a start permission signal for the travel drive source.

In a case where the own vehicle starts traveling in S7 (YES in S7), the process flow proceeds to S8. In another case where the own vehicle does not start traveling (NO in S7), the process flow returns to S3 for repeated processing. Whether or not the own vehicle has started traveling may be determined by the microcomputer 20 in accordance with a signal indicating that an ignition power source of the own vehicle is turned ON, or may be determined by the microcomputer 20 in accordance with a signal from a speed sensor of the own vehicle.

In S8, the switch control unit 210 switches to the schedule indicated in the schedule table for the TPM function (hereinafter, simply called the schedule for the TPM function), and the header transmission unit 220 executes header transmission in accordance with the schedule for the TPM function.

In a case where the own vehicle parks in S9 (YES in S9), the process flow proceeds to S10. The processing in S9 is repeated in another case where the own vehicle is not parking (NO in S9). Whether or not the own vehicle has parked may be determined by the microcomputer 20 in accordance with a signal indicating that a parking brake of the own vehicle is turned ON, or may be determined by the microcomputer 20 in accordance with a signal from a shift position sensor of the own vehicle.

In a case where the body ECU 2 comes into the sleep state in S10 (YES in S10), the process flow proceeds to S11. The process flow returns to S3 for repeated processing in another case where the body ECU 2 does not come into the sleep state (NO in S10). Examples of the case where the body ECU 2 comes into the sleep state include a case where the ignition power source of the own vehicle is turned OFF. In S11, the body ECU 2 transmits a sleep request to the RF receiver 3 via the serial communication line 4 to bring the RF receiver 3 into the sleep state and end the serial communication related processing.

Figure 10:
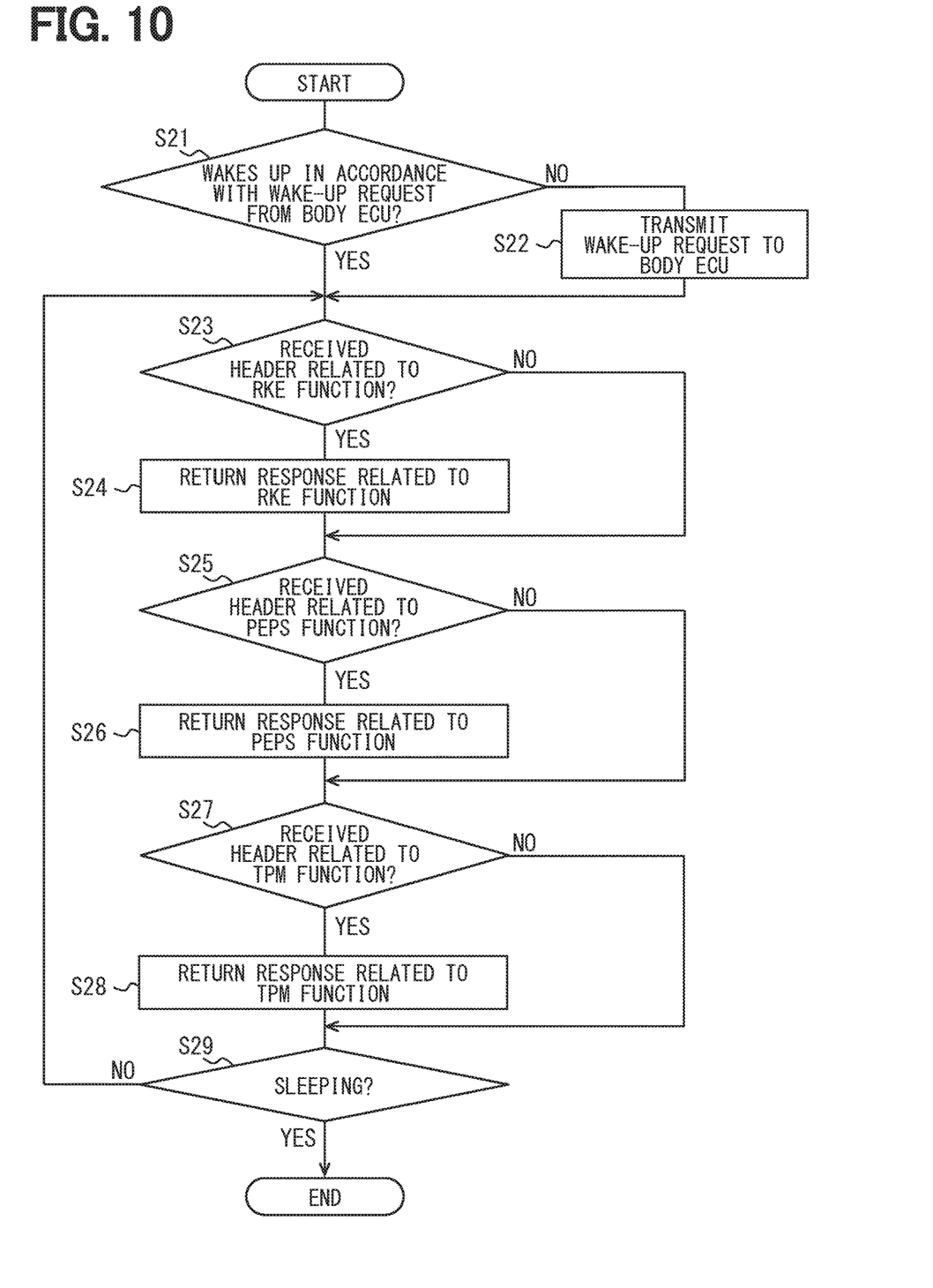
FIG. 10 is a flowchart showing an exemplary flow of a serial communication related processing executed by a RF receiver.

An exemplary flow of serial communication related processing executed by the RF receiver 3 as the slave node will be described below with reference to the flowchart in FIG. 10. The flowchart in FIG. 10 may start when the RF receiver 3 wakes up from the sleep state.

In a case where the RF receiver 3 wakes up in accordance with a wake-up request from the body ECU 2 initially in S21 (YES in S21), the process flow proceeds to S23. In another case where the RF receiver 3 wakes up not in accordance with the wake-up request from the body ECU 2 (NO in S21), the process flow proceeds to S22. Examples of the case where the RF receiver 3 wakes up not in accordance with the wake-up request from the body ECU 2 include waking up upon receipt of an RF signal transmitted in accordance with switch operation to the mobile device 8. In S22, the microcomputer 30 transmits the wake-up request to the body ECU 2 via the serial communication line 4 to wake up the body ECU 2 from the sleep state. The process flow then proceeds to S23.

In a case where the header reception unit 310 receives the header including the header ID "0x01", in other words, the header related to the RKE function in S23 (YES in S23), the process flow proceeds to S24. In another case where the header reception unit 310 does not receive any header related to the RKE function (NO in S23), the process flow proceeds to S25. In S24, the response transmission unit 320 returns the response related to the RKE function, and the process flow then proceeds to S25.

In a case where the header reception unit 310 receives the header including the header ID "0x02", in other words, the header related to the PEPS function in S25 (YES in S25), the process flow proceeds to S26. In another case where the header reception unit 310 does not receive any header related to the PEPS function (NO in S25), the process flow proceeds to S27. In S26, the response transmission unit 320 returns the response related to the PEPS function, and the process flow then proceeds to S27.

In a case where the header reception unit 310 receives the header including the header ID "0x03", in other words, the header related to the TPM function in S27 (YES in S27), the process flow proceeds to S28. In another case where the header reception unit 310 does not receive any header related to the TPM function (NO in S27), the process flow proceeds to S29. In S28, the response transmission unit 320 returns the response related to the TPM function, and the process flow then proceeds to S29.

In a case where the RF receiver 3 comes into the sleep state in S29 (YES in S29), the serial communication related processing ends upon transition into the sleep state. The process flow returns to S23 for repeated processing in another case where the RF receiver 3 does not come into the sleep state (NO in S29). Examples of the case where the RF receiver 3 comes into the sleep state include receipt of the sleep request from the body ECU 2.

In the above configuration, the processing in S26 or S28 is not executed but the processing in S24 is executed sequentially while the header related to the RKE function is received sequentially. Accordingly, each time the header related to the RKE function is received, the response related to the RKE function is returned, and the responses for two frames as a necessary number of times of response are returned. While the header related to the PEPS function is received sequentially, the processing in S24 or S28 is not executed but the processing in S26 is executed sequentially. Accordingly, each time the header related to the PEPS function is received, the response related to the PEPS function are returned, and the responses for three frames as a necessary number of times of response are returned. While the header related to the TPM function is received sequentially, the processing in S24 or S26 is not executed but the processing in S28 is executed sequentially. Accordingly, each time the header related to the TPM function is received, the response related to the TPM function is returned.

According to the first embodiment, the body ECU 2 as the master node transmits the header including the header ID assigned individually to the designated function, and the RF receiver 3 as the slave node returns the response related to the function designated by the header ID. The body ECU 2 can thus designate any one of the plurality of functions of the RF receiver 3 by means of the header ID and cause the RF receiver 3 to return the response. Since the body ECU 2 transmits the header related to the target function in accordance with the schedule preset individually for each of the functions, the response related to the target function can be received promptly. The body ECU 2 can accordingly achieve further improvement in responsiveness for receiving responses from the RF receiver 3 in comparison to a configuration in which the body ECU 2 causes the RF receiver 3 to return responses sequentially for all the functions. This enables further improvement in responsiveness of the master node receiving the responses from the slave node even when the slave node has the plurality of functions for each of which the response different from each other is transmitted.

Figure 11:
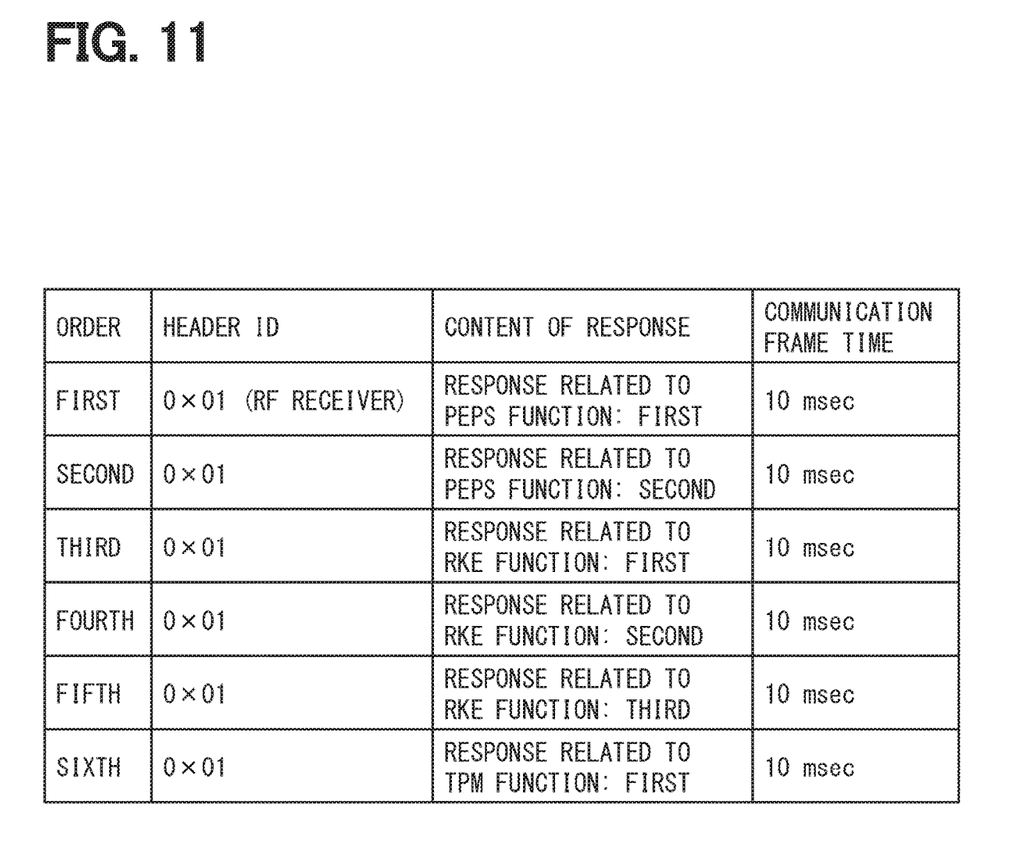
FIG. 11 is a diagram for explaining a schedule table according to a comparative example.

Improvement in responsiveness for receiving the responses according to the first embodiment will be specifically exemplified below with reference to FIG. 11. FIG. 11 is an example of a schedule according to a communication system adopting the LIN according to a comparative example, for header transmission from the master node to the slave node having the PEPS function, the RKE function, and the TPM function.

The communication system according to the comparative example is different from the first embodiment in that, even when the slave node has the plurality of functions, the header is provided only for designation of an individual slave node but not for designation of an individual function. As indicated in FIG. 11, the schedule defines which order number of response related to which function is to be returned upon transmission of a header having which order number. In any case, responses are returned sequentially for all of the functions so that the response related to a target function is received.

Specifically, the schedule defines returning a first response related to the PEPS function with respect to a first header, a second response related to the PEPS function with respect to a second header, and a first response related to the RKE function with respect to a third header. The schedule further defines returning a second response related to the RKE function with respect to a fourth header, a third response related to the RKE function with respect to a fifth header, and a first response related to the TPM function with respect to a sixth header. The schedule includes first processing to sixth processing to be executed repeatedly. In a case where there is input through the PEPS-related SW and the response related to the PEPS function is needed during transmission of the second header in the schedule, it takes at least 50 msec for completion of the second processing to the sixth processing, before reception of the response related to the PEPS function in an appropriate order in the first processing.

Figure 3:
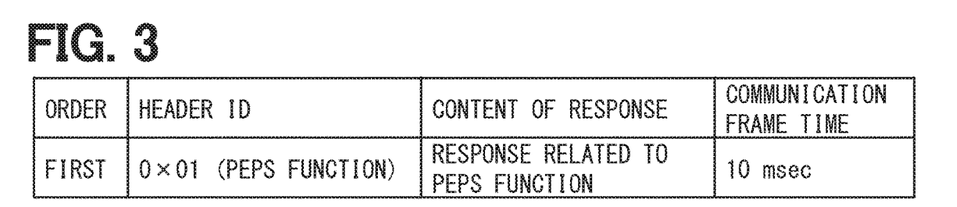
FIG. 3 is a diagram for explaining an example of the schedule tables according to the first embodiment.
Figure 4:
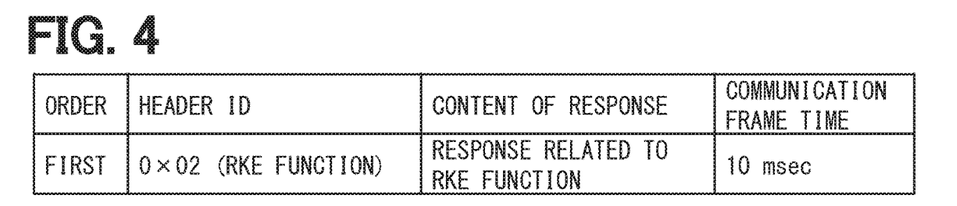
FIG. 4 is a diagram for explaining an example of the schedule tables according to the first embodiment.
Figure 5:
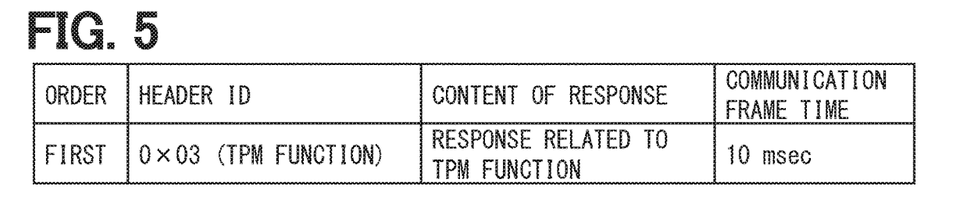
FIG. 5 is a diagram for explaining an example of the schedule tables according to the first embodiment.

In contrast, according to the configuration of the first embodiment, since the header related to the target function is transmitted in accordance with the schedule preset individually for each of the functions as indicated in FIG. 3 to FIG. 5, the response related to the target function can be received promptly by switching to the schedule for the individual function before completion of response not related to the target function. In a case where there is input through the PEPS-related SW even during transmission of the header related to the RKE function, the configuration can shorten, to about 10 msec at the maximum, delay until receipt of an appropriate order of response related to the PEPS function by switching from the schedule for the RKE function to the schedule for the PEPS function.

In addition, according to the configuration of the first embodiment, since the body ECU 2 transmits the header related to the target function in accordance with the schedule preset individually for each of the functions, the RF receiver 3 having the plurality of functions can be prevented from ineffectively returning response related to any function other than the target function.

Furthermore, according to the configuration of the first embodiment, the response returned from the RF receiver 3 in accordance with the header includes the "frame No" indicating an order number of the response with respect to transmission of the header. The body ECU 2 as the master node can thus easily determine whether or not response is received a necessary number of times in an appropriate order in accordance with the "frame No".

Second Embodiment

The first embodiment has the configuration in which the response returned in accordance with the header includes the "frame No" indicating an order number of the response with respect to transmission of the header. The present disclosure is not necessarily limited to this configuration. For example, the present disclosure may have a configuration in which a response returned in accordance with a header does not include data indicating an order number of the response with respect to transmission of the header (hereinafter, a second embodiment).

Figure 12:
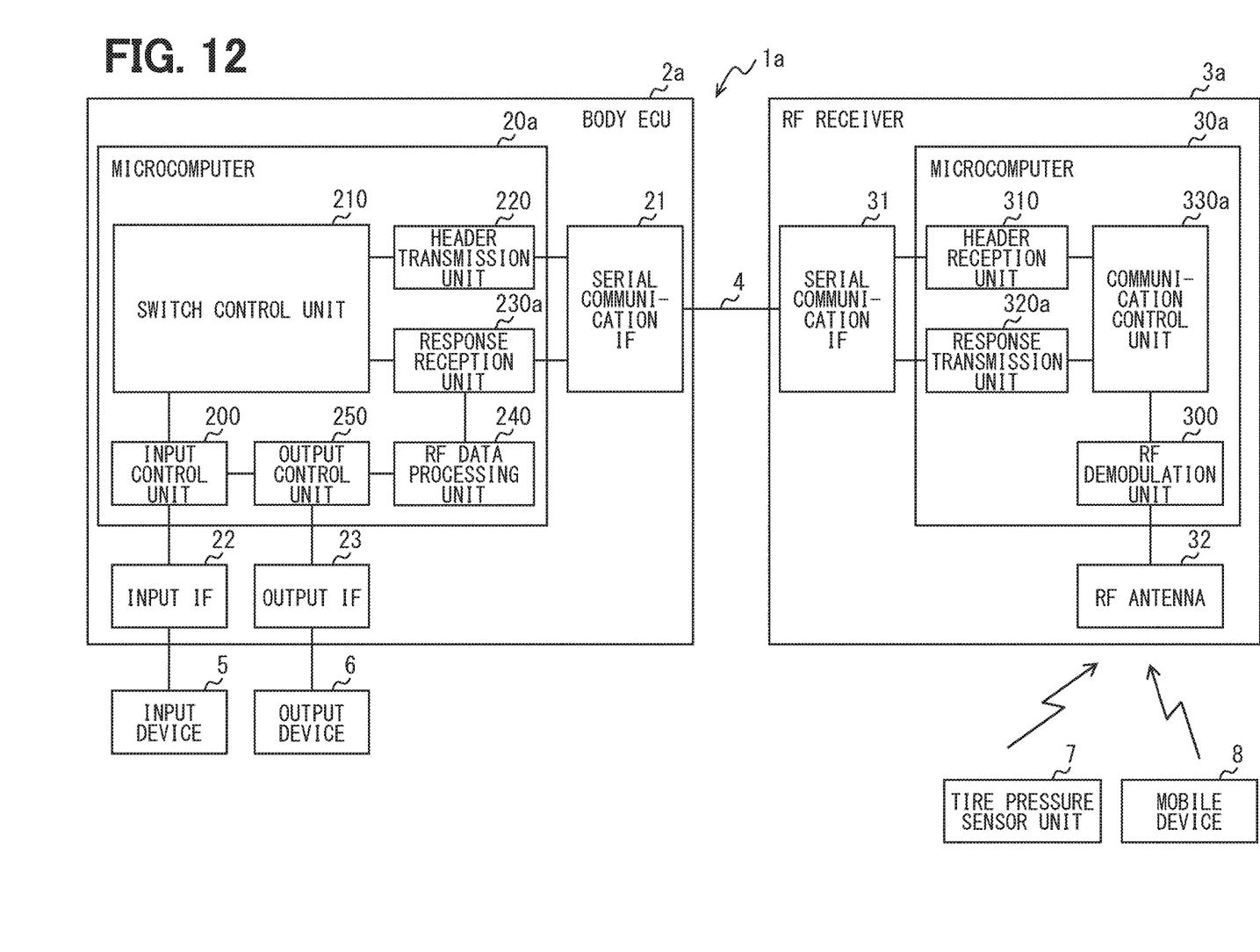
FIG. 12 is a diagram showing a schematic configuration of an in-vehicle communication system according to a second embodiment of the present disclosure.

The configuration according to the second embodiment will be described below with reference to FIG. 12. The second embodiment provides an in-vehicle communication system 1a including a body ECU 2a as a master node, an RF receiver 3a as a slave node, and a serial communication line 4, as shown in FIG. 12. The in-vehicle communication system 1a also corresponds to the communication system.

As shown in FIG. 12, the RF receiver 3a includes a microcomputer 30a, a serial communication IF 31, and an RF antenna 32. The RF receiver 3a is configured similarly to the RF receiver 3 according to the first embodiment except that the microcomputer 30a replaces the microcomputer 30.

The microcomputer 30a includes, as functional blocks, an RF demodulation unit 300, a header reception unit 310, a response transmission unit 320a, and a communication control unit 330a. The microcomputer 30a is configured similarly to the microcomputer 30 according to the first embodiment except that the response transmission unit 320a and the communication control unit 330a replace the response transmission unit 320 and the communication control unit 330, respectively.

The communication control unit 330a is configured similarly to the communication control unit 330 according to the first embodiment except that response output to and transmitted from the response transmission unit 320a is partially different in data structure. Specifically, the communication control unit 330a transmits, to the response transmission unit 320a, a response without "frame No" indicating an order number of the response. The communication control unit 330a causes the response transmission unit 320a to sequentially return the response without "frame No" upon receipt of each header. The response transmission unit 320a transmits the response without "frame No" output from the communication control unit 330a. The response transmission unit 320a also corresponds to the return unit.

Figure 13:
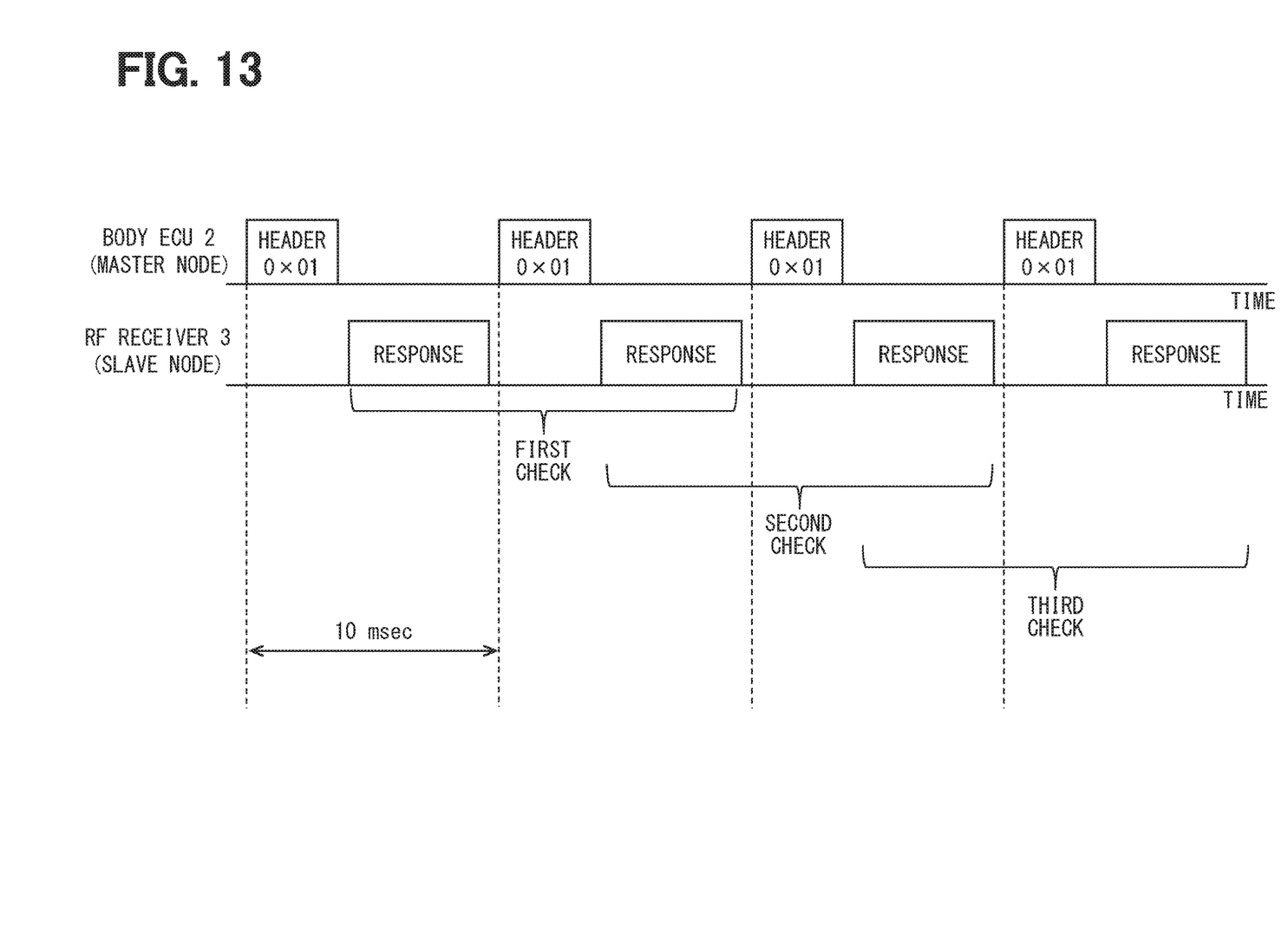
FIG. 13 is a diagram for explaining an example of returns of responses upon transmissions of headers according to the second embodiment.

An example of returns of responses with respect to transmission of a header including a header ID related to a PEPS function in the second embodiment will be described below with reference to FIG. 13. As shown in FIG. 13, the body ECU 2a as the master node transmits a header including a header ID "0x01" every 10 msec in accordance with the schedule indicated in the schedule table in FIG. 3. Upon each receipt of the header, the RF receiver 3a as the slave node alternately returns a first response without "frame No" and a second response without "frame No".

As shown in FIG. 12, the body ECU 2a includes a microcomputer 20a, a serial communication IF 21, an input IF 22, and an output IF 23. The body ECU 2a is configured similarly to the body ECU 2 according to the first embodiment except that the microcomputer 20a replaces the microcomputer 20.

As shown in FIG. 12, the microcomputer 20a includes, as functional blocks, an input control unit 200, a switch control unit 210, a header transmission unit 220, a response reception unit 230a, an RF data processing unit 240, and an output control unit 250. The microcomputer 20a is configured similarly to the microcomputer 20 according to the first embodiment except that the response reception unit 230a replaces the response reception unit 230.

Similarly to the response reception unit 230, the response reception unit 230a receives the response without "frame No" returned from the RF receiver 3 in accordance with the header transmitted from the header transmission unit 220a. The response reception unit 230a determines response completion for the function designated by the header transmitted from the header transmission unit 220, in accordance with the responses received sequentially and the number of times of response for each function, which is stored in a nonvolatile memory of the body ECU 2. For example, the response reception unit 230a checks sequentially received responses the number of times of reception for the function, determines response completion upon acquisition of the responses necessary number of times in an appropriate order, and then transmits reply data in the acquired response to the RF data processing unit 240. The microcomputer 20a may hold information on a structure of appropriate response individually for the designated function and the response reception unit 230a may execute the above check in accordance with the information.

An example of reception of responses returned with respect to transmission of a header including the header ID related to the PEPS function will be described below with reference to FIG. 13. As shown in FIG. 13, upon each receipt of the header related to the PEPS function, the RF receiver 3a as the slave node alternately returns the first response without "frame No" and the second response without "frame No". The response reception unit 230a checks sequentially received response every two times and determines response completion upon acquisition of the responses a necessary number of times in an appropriate order. In the example shown in FIG. 13, in a first check and a third check, the first response and the second response are in the appropriate order. Thus, the response reception unit 230*a* determines acquisition of the responses the necessary number of times in the appropriate order. On the other hand, in a second check, the first response and the second response are not in the appropriate order. Thus, the response reception unit 230*a* determines failure in acquisition of the responses the necessary number of times in the appropriate order, and can be restricted from transmitting reply data in erroneous response to the RF data processing unit 240.

The second embodiment enables determination of acquisition of responses a necessary number of times of reception even in the case where responses transmitted from the RF receiver 3*a* do not include data indicating an order number of the response with respect to transmission of the header. Thus, effects similar to those of the first embodiment can be achieved.

Third Embodiment

The embodiments described above each provide the in-vehicle communication system 1 or 1*a* includes the master node and the single slave node. The present disclosure is not necessarily limited to this configuration. The in-vehicle communication system 1 or 1*a* may alternatively include the master node and a plurality of slave nodes. In a case where the PEPS function, the RKE function, and the TPM function of the RF receiver 3 or 3*a* are achieved respectively by a plurality of electronic components, the plurality of electronic components corresponds to the plurality of slave nodes included in the in-vehicle communication system 1 or 1*a*.

In the case where the in-vehicle communication system 1 or 1*a* includes the plurality of slave nodes, each of the slave nodes does not need to have a plurality of functions, but part of the slave nodes may have only one function. The function referred to herein at least relates to differently returning response to each header transmitted from the master node.

Even in the case where the in-vehicle communication system 1 or 1*a* includes the plurality of slave nodes part of which has only one function, this configuration achieves an effect similar to that according to the first embodiment if other part of the slave nodes has a plurality of functions.

Fourth Embodiment

The embodiments described above each provide the body ECU 2 or 2*a* as the master node and the RF receiver 3 or 3*a* as the slave node. The present disclosure is not necessarily limited to this configuration. The master node may be embodied by an electronic component such as an ECU other than the body ECU 2 or 2*a*, or the slave node may be embodied by an electronic component other than the RF receiver 3 or 3*a*.

Fifth Embodiment

The embodiments described above each exemplify the in-vehicle communication system 1 or 1*a* mounted on the vehicle. The present disclosure is not necessarily limited to this configuration but may alternatively be applied to a subject other than the vehicle.

The flowcharts or the processing shown in the flowcharts according to the present disclosure include a plurality of sections (alternatively referred to as steps) each indicated by S100 or the like. Some of the sections may be further divided into a plurality of subsections or may be appropriately combined to configure a single section. Each of these sections may also be referred to as a circuit, a device, a module, or means.

Each of the plurality of units or some of the units combined to each other can be embodied as (i) a software unit combined with a hardware unit (e.g., a computer) or (ii) a unit of hardware (e.g., an integrated circuit or a wiring logic circuit) including or excluding a function of a relevant device. The unit of hardware can still alternatively be installed in the microcomputer.

The present disclosure has been described with reference to the embodiments, but the present disclosure should not be limited to the embodiments or structures according to the embodiments. The present disclosure can also include various modification examples as well as modifications made within equivalent scopes. Furthermore, various combinations and modes, as well as other combinations and modes each obtained by adding only one or more elements to or removing any element from any one of the various combinations and modes will fall within the scope and the ideological scope of the present disclosure.

What is claimed is:

1. A communication system comprising:
a master node; and
a slave node connected to the master node via a bus, wherein
the master node includes a master processor and a master memory that stores a master control program,
the slave node includes a slave processor and a slave memory that stores a slave control program,
the slave node has a plurality of functions for each of which a response different from each other is transmitted,
the master memory further stores identification information assigned individually for the plurality of functions, a schedule preset individually for the plurality of functions, a number of times of returning response preset individually for the plurality of functions, and information on a structure of an appropriate response preset individually for the plurality of functions,
the master control program includes commands configured to, when executed by the master processor, cause the master processor to transmit, to the slave, a header including the identification information assigned individually to a designated function in accordance with the schedule preset individually for the designated function,
the slave control program includes commands configured to, when executed by the slave processor, cause the slave processor to return the response related to the designated function a plurality of times without order information indicating an order number of the response returned for the designated function when the designated function assigned with the identification information included in the header that is received is one of the plurality of functions of the slave node, and
the commands in the master control program are configured to, when executed by the master processor, further cause the processor to:
receive the responses sequentially returned from the slave node;
check the responses every two times based on the number of times of returning the response preset individually for the designated function and the information on the structure of the appropriate response preset individually for the designated function, which are stored in the master memory; and determine completion of the response related to the designated function upon acquisition of the responses a necessary number of times in an appropriate order.

2. The communication system according to claim 1, wherein
the commands in the master control program are configured to, when executed by the master processor, further cause the master processor to start transmitting the header including the identification information assigned individually to the designated function in accordance with a trigger for the designated function.

3. The communication system according to claim 1, wherein
the communication system is to be mounted on a vehicle, and
the master node and the slave node are electronic components to be mounted on the vehicle.

4. A master node applied to a communication system including the master node and a slave node connected to the master node via a bus, the master node comprising a master processor and a master memory that stores a master control program, wherein
the slave node includes a slave processor and a slave memory that stores a slave control program,
the slave node has a plurality of functions for each of which a response different from each other is transmitted,
the master memory further stores identification information assigned individually for the plurality of functions, a schedule preset individually for the plurality of functions, a number of times of returning response preset individually for the plurality of functions, and information on a structure of an appropriate response present individually for the plurality of functions,
the master control program includes commands, configured to, when executed by the master processor, cause the master procewssor to transmit, to the slave, a header including the identification information assigned to a designated function in accordance with the schedule preset individually for the designated function,
the slave control program includes commands configured to, when executed by the slave processor, cause the slave processor to return the response related to the designated function a plurality of times without order information indicating an order function assigned with the identification information included in the header that is received is one of the plurality of functions of the slave node, and
the commands in the master control program are configured to, when executed by the master processor, further cause the processor to:
receive the responses sequentially returned from the slave node;
check the responses every two times based on the number of times of returning the response preset individually for the designated function and the information on the structure of the appropriate response present individually for the designated function, which are stored in the master memory; and
determine completion of the response related to the designated function upon acquisition of the responses a necessary number of times in an appropriate order.

5. A control program product stored in a non-transitory tangible computer-readable storage medium and applied to a communication system including a master node and a slave node connected to the master node via a bus, wherein
the master node includes a master processor and a master memory,
the slave node has a plurality of functions each of which a response different from each other is transmitted,
the master memory further stores identification information assigned individually for the plurality of functions, a schedule preset individually for the plurality of functions, a number of times of returning response preset individually for the plurality of functions, and information on a structure of an appropriate response preset individually for the plurality of functions,
the control program product comprising commands causing the master processor to
transmit, to the slave node, a header including the identification information assigned to a designated function in accordance with the schedule preset individually for the designated function, wherein
the slave node includes a slave control program product including commands causing a slave processor in the slave node to return the response related to the designated function of a plurality of times without order information indicating an order number of the response returned for the designated function when the designated function assigned with the identification information included in the header that is received is one of the plurality of functions of the slave node, and
the commands in the control program product are configured to further cause the master processor to:
receive the responses sequentially returned from the slave node;
check the responses every two times based on the number of times of returning the response preset individually for the designated function and the information on the structure of the appropriate response preset individually for the designated function, which are stored in the master memory; and
determine completion of the response related to the designated function upon acquisition of the responses a necessary number of times in an appropriate order.

* * * * *